J. B. Eads' Device for Storing-up and Utilizing the Recoil of Heavy Guns

B

4472

REISSUED JUL 18 1871

Fig. 1.

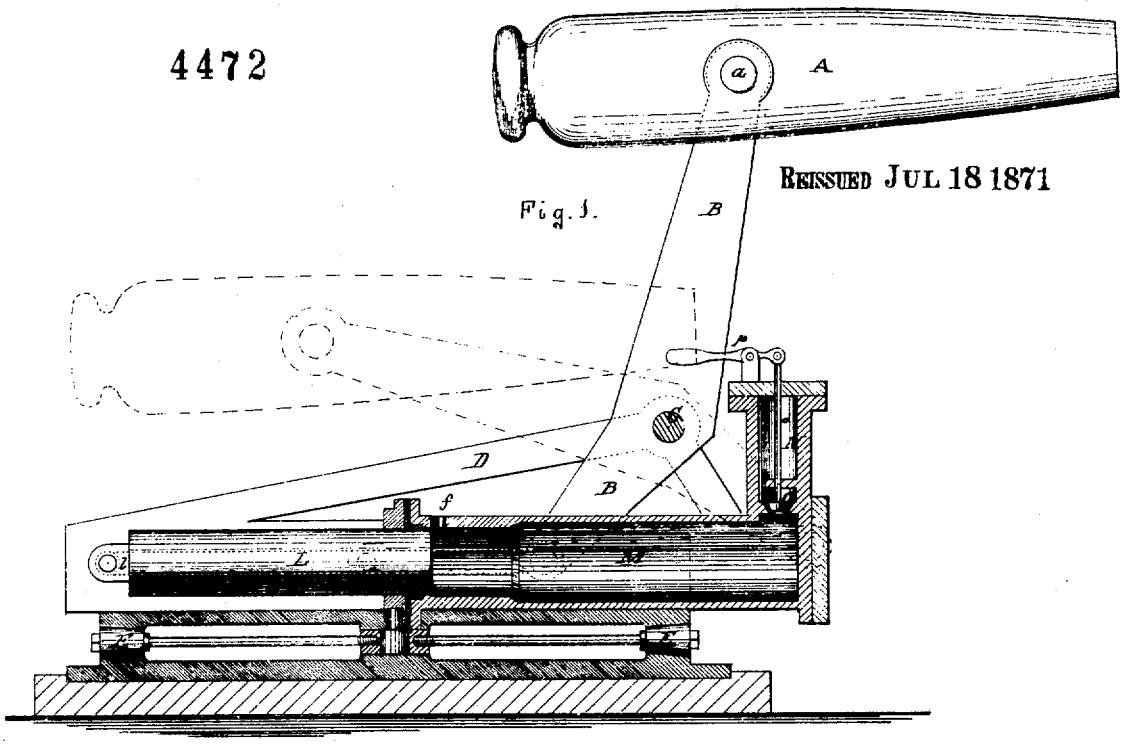

Fig. 2.

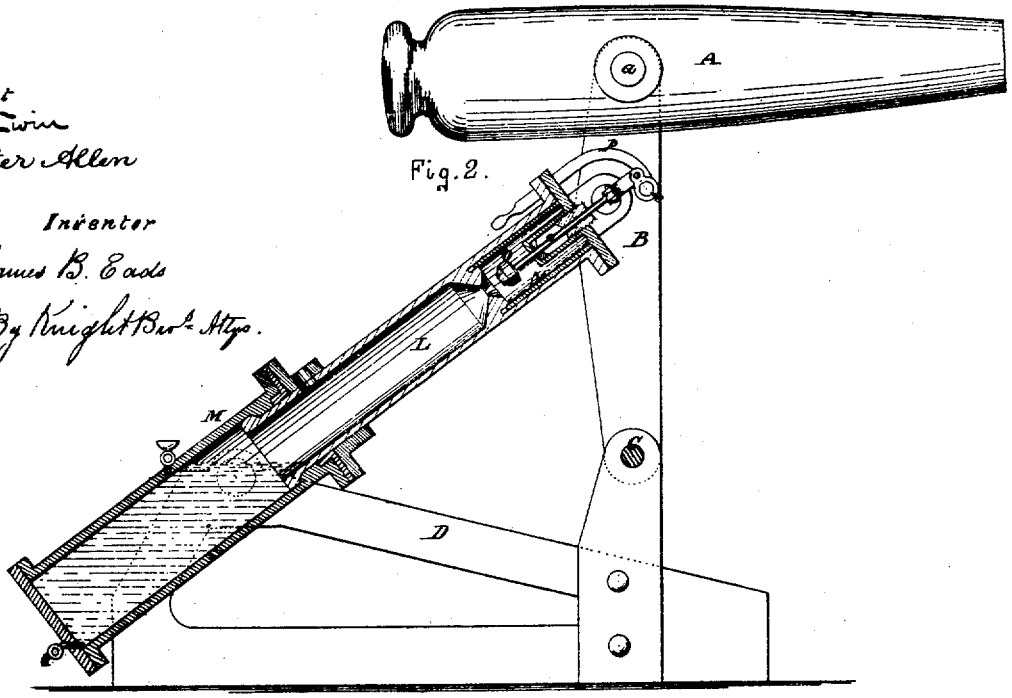

Attest
Jas L Erwin
Walter Allen

Inventor
James B. Eads
By Knight Bros Attys.

4,472. — Division B. — GUN-CARRIAGE.—James B. Eads, St. Louis, Mo.—Patent No. 93,691, dated August 17, 1869.

*Claim.*—1. The combination of a gun with a cylinder, in which air of the natural density is used to take up and store the force of recoil for the purpose of restoring the gun again to the position for firing.

2. The combination [illegible]

UNITED STATES PATENT OFFICE.

JAMES B. EADS, OF ST. LOUIS, MISSOURI.

IMPROVEMENT IN GUN-CARRIAGES.

Specification forming part of Letters Patent No. 93,691, dated August 17, 1869; reissue No. 4,472, dated July 18, 1871.

DIVISION B.

*To all whom it may concern:*

Be it known that I, JAMES B. EADS, of St. Louis, in the county of St. Louis and State of Missouri, have invented a new and Improved Device for Storing Up and Utilizing the Recoil of Heavy Guns; and I do hereby declare the following is a full, clear, and exact description thereof, which will enable others skilled in the art to make and use the same, reference being had to the accompanying drawing forming part of this specification.

Figure 1 is a sectional side elevation of one form of my device, the broken outlines indicating the loading position of the gun. Fig. 2 is a similar view of a modification of said device.

This invention relates to storing up the power developed in the recoil of large guns, so that it may be afterward utilized, at the will of the operator, to run the gun into battery or raise it above a parapet or other defence to admit firing over the same. In order to carry my invention into operation by the compression of air, different methods may be employed. Of these, two are illustrated in the drawing, in both of which air of the natural density is used to take up and store the force of recoil for the purpose of restoring the gun again to the position for firing. I do not confine myself to the two methods shown, as other equivalent arrangements may be used for the same purpose.

The gun A is supported by its trunnions *a* in the upper end of a lever-frame, B, pivoted by a cross shaft, C, shown in section, to the carriage-frame D, that may be of any suitable construction. In Fig. 1 the lower ends of the lever-frame B are connected by rods *l* (shown in dotted lines) to a plunger, L. The plunger works in a cylinder, M, attached to the carriage-frame D. The cylinder M, when the gun is in the firing position, as shown by full lines, is filled with air at the normal atmospheric density, the interior of the cylinder being in communication with the outer air by an aperture, *f*, which is closed by the plunger as it is forced into the cylinder by the discharge and recoil of the gun. The interior of the cylinder M communicates with an air-chamber, N, through the port of a valve, O, whose rod *o* is connected to a lever, *p*, by which it may be raised from its seat. The gun-carriage is shown supported on rollers E; but any form of support may be used. A modification is shown in Fig. 2. In this the cylinder M is pivoted to the carriage-frame D, and the plunger L is made tubular and pivoted to the frame B, as shown. The separate air-chamber N forms an extension of the plunger-cylinder L. The cylinder M contains water or other liquid, which may be in sufficient quantity to fill the whole interior of the plunger L when said plunger is forced into the cylinder M by the recoil of the gun. In this case the air is all forced into the chamber N and retained there by the valve O until the valve is raised to allow the air to escape into the plunger L to force the latter outward and restore the gun to its firing position.

The operation is substantially the same in the two forms illustrated, and is as follows: The gun, being loaded and in its elevated or forward position, is discharged, and its recoil forces the upper end of the frame B backward and downward. This movement of the frame forces the plunger L into the cylinder M and expels more or less of the contents of the said cylinder into the air-chamber N, where it is retained until the gun is loaded. The valve O may be raised at any time and the air allowed to escape into the cylinder and to force the plunger L outward, which acts upon the frame B to throw the gun into the firing position, (shown by full lines,) the loading position of the gun being shown by broken lines in Fig. 1.

I claim as my invention—

1. The combination of a gun with a cylinder, in which air of the natural density is used to take up and store the force of recoil for the purpose of restoring the gun again to the position for firing.

2. The combination of the gun A, frame B, carriage D, plunger L, and cylinder M, as and for the purpose set forth.

In testimony of which invention I hereunto set my hand.

JAS. B. EADS.

Witnesses:
SAML. KNIGHT,
GEO. C. FABIAN.